US008824872B2

(12) United States Patent
Fujiwara

(10) Patent No.: US 8,824,872 B2
(45) Date of Patent: Sep. 2, 2014

(54) DISPLAY CONTROL APPARATUS, REPRODUCTION SYSTEM, AND RECORDING MEDIUM IN WHICH DISPLAY CONTROL IS PERFORMED BASED ON A DETECTED EVENT

(75) Inventor: Masato Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/477,211

(22) Filed: May 22, 2012

(65) Prior Publication Data

US 2012/0308194 A1    Dec. 6, 2012

(30) Foreign Application Priority Data

Jun. 2, 2011    (JP) .................................. 2011-124462

(51) Int. Cl.
*H04N 5/783*    (2006.01)
*H04N 21/432*   (2011.01)
*H04N 21/439*   (2011.01)
*H04N 5/93*     (2006.01)
*H04N 21/44*    (2011.01)
*H04N 9/82*     (2006.01)
*H04N 5/775*    (2006.01)

(52) U.S. Cl.
CPC ........... *H04N 5/783* (2013.01); *H04N 21/4325* (2013.01); *H04N 21/4394* (2013.01); *H04N 9/8205* (2013.01); *H04N 5/775* (2013.01); *H04N 5/93* (2013.01); *H04N 21/44008* (2013.01)
USPC ........................................................ 386/343

(58) Field of Classification Search
CPC .......... H04N 21/4325; H04N 21/4394; H04N 21/44008; H04N 5/775; H04N 5/783; H04N 5/93; H04N 9/8205
See application file for complete search history.

(56) References Cited

U.S. PATENT DOCUMENTS 7,555,713 B2 *  6/2009  Yang ............................ 715/248
2008/0147664 A1  6/2008  Fujiwara et al. ................. 707/7

FOREIGN PATENT DOCUMENTS

JP    2005-260862 A    9/2005
JP    2006-166322 A    6/2006

* cited by examiner

*Primary Examiner* — Huy T Nguyen
(74) *Attorney, Agent, or Firm* — Fitzpatrick, Cella, Harper & Scinto

(57) ABSTRACT

Whether images are to be displayed in a display order or at a display speed is determined for each type of event for when images that are recorded in a recording unit in association with events detected by a detection unit, which are to be displayed by a display unit. The display order indicates whether the images are to be displayed in chronological order or in reverse chronological order. The display speed indicates a display speed at which the images are to be reproduced by the display unit.

16 Claims, 11 Drawing Sheets

F I G. 6

EVENT LIST

| EVENT ID | EVENT OCCURRENCE CAMERA ID | EVENT TYPE | EVENT OCCURRENCE TIME |
|---|---|---|---|
| 1823 | Camera1 | SENSOR | 2010/12/23 18:22 |
| 1824 | Camera1 | ABANDONMENT DETECTION | 2010/12/23 19:12 |
| 1825 | Camera2 | ABANDONMENT DETECTION | 2010/12/23 20:02 |
| 1826 | Camera1 | REMOVAL DETECTION | 2010/12/23 20:52 |
| 1827 | Camera1 | VOLUME DETECTION | 2010/12/23 21:42 |
| 1828 | Camera2 | MOTION DETECTION | 2010/12/23 22:32 |
| 1829 | Camera1 | VOLUME DETECTION | 2010/12/23 23:21 |
| 1830 | Camera2 | MOTION DETECTION | 2010/12/24 0:11 |
| 1831 | Camera1 | SENSOR | 2010/12/24 1:01 |
| 1832 | Camera1 | SENSOR | 2010/12/24 1:51 |
| 1833 | Camera2 | SENSOR | 2010/12/24 2:41 |
| 1834 | Camera1 | ABANDONMENT DETECTION | 2010/12/24 3:31 |
| 1835 | Camera2 | ABANDONMENT DETECTION | 2010/12/24 4:21 |
| 1836 | Camera2 | REMOVAL DETECTION | 2010/12/24 5:11 |
| 1837 | Camera1 | VOLUME DETECTION | 2010/12/24 6:00 |
| 1838 | Camera1 | MOTION DETECTION | 2010/12/24 6:50 |
| 1839 | Camera2 | VOLUME DETECTION | 2010/12/24 7:40 |
| 1840 | Camera2 | MOTION DETECTION | 2010/12/24 8:30 |
| 1841 | Camera1 | MOTION DETECTION | 2010/12/24 9:20 |
| 1842 | Camera2 | MOTION DETECTION | 2010/12/24 10:10 |

FIG. 7

| DISPLAY METHOD ID | EVENT TYPE | DISPLAY ORDER | DISPLAY SPEED |
|---|---|---|---|
| 1 | SENSOR | CHRONOLOGICAL ORDER | 1 |
| 2 | MOTION DETECTION | CHRONOLOGICAL ORDER | 1/2 |
| 3 | ABANDONMENT DETECTION | REVERSE CHRONOLOGICAL ORDER | 2 |
| 4 | REMOVAL DETECTION | REVERSE CHRONOLOGICAL ORDER | 1/2 |
| 5 | VOLUME DETECTION | REVERSE CHRONOLOGICAL ORDER | 1/2 |

FIG. 8

EDIT DISPLAY METHOD

DISPLAY METHOD 1: SENSOR

OFFSET: ● BEFORE EVENT  ○ AFTER EVENT  [10] SEC

DISPLAY ORDER: ● CHRONOLOGICAL ORDER
○ REVERSE CHRONOLOGICAL ORDER

DISPLAY SPEED: ○ 2X  ● 1X  ○ 1/2X

DISPLAY METHOD 2: MOTION DETECTION

[SAVE]

| DISPLAY SEQUENCE ID | EVENT TYPE | DISPLAY START OFFSET TIME | OFFSET DIRECTION | DISPLAY METHOD ID | DISPLAY ORDER | DISPLAY SPEED | DISPLAY TIME |
|---|---|---|---|---|---|---|---|
| 1 | SENSOR | 10 SEC | BEFORE EVENT | 1-1 | CHRONOLOGICAL ORDER | 1 | 18 SEC |
|   |   |   |   | 1-2 | CHRONOLOGICAL ORDER | 1/2 | 4 SEC |
|   |   |   |   | 1-3 | CHRONOLOGICAL ORDER | 1 | 18 SEC |
| 2 | MOTION DETECTION | 1 SEC | BEFORE EVENT | 2-1 | CHRONOLOGICAL ORDER | 1/2 | — |
| 3 | ABANDONMENT DETECTION | — | — | 3-1 | REVERSE CHRONOLOGICAL ORDER | 2 | 5 SEC |
|   |   |   |   | 3-2 | REVERSE CHRONOLOGICAL ORDER | 1/2 | 10 SEC |
|   |   |   |   | 3-3 | REVERSE CHRONOLOGICAL ORDER | 1 | — |
| 4 | REMOVAL DETECTION | 5 SEC | AFTER EVENT | 4-1 | REVERSE CHRONOLOGICAL ORDER | 1/2 | 10 SEC |
|   |   |   |   | 4-2 | REVERSE CHRONOLOGICAL ORDER | 1 | 10 SEC |
|   |   |   |   | 4-3 | REVERSE CHRONOLOGICAL ORDER | 2 | 10 SEC |
| 5 | VOLUME DETECTION | 5 SEC | BEFORE EVENT | 2-1 | CHRONOLOGICAL ORDER | 1 | — |

FIG. 12

```
EDIT DISPLAY SEQUENCE

DISPLAY SEQUENCE 1: SENSOR
  OFFSET:  ● BEFORE EVENT   ○ AFTER EVENT   [ 10 ] SEC

DISPLAY METHOD 1-1
    DISPLAY ORDER:  ● CHRONOLOGICAL ORDER
                    ○ REVERSE CHRONOLOGICAL ORDER

DISPLAY SPEED:  ○ 2X       ● 1X        ○ 1/2X

DISPLAY TIME:   [ 18 ] SEC

DISPLAY METHOD 1-2
    DISPLAY ORDER:  ● CHRONOLOGICAL ORDER
                    ○ REVERSE CHRONOLOGICAL ORDER

[ SAVE ]
```

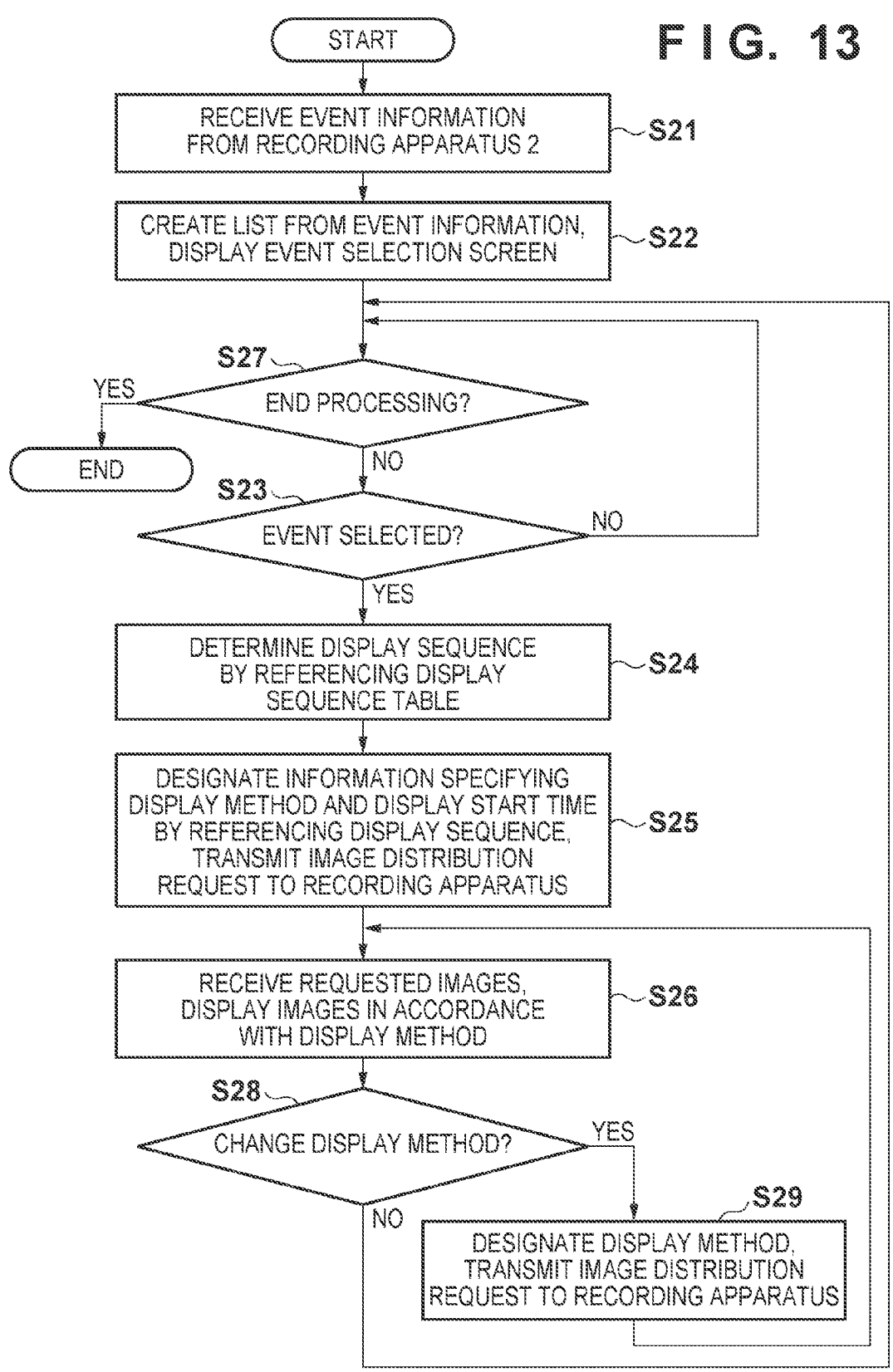

DISPLAY CONTROL APPARATUS, REPRODUCTION SYSTEM, AND RECORDING MEDIUM IN WHICH DISPLAY CONTROL IS PERFORMED BASED ON A DETECTED EVENT

BACKGROUND OF THE INVENTION

1. Field of the Invention

The present invention relates to a display control apparatus, a recording/reproduction system, and a recording medium.

2. Description of the Related Art

Conventionally, there are recording/reproduction systems for recording images of objects captured by a camera and then reproducing the recorded images. In these conventional recording/reproduction systems, in order to effectively reproduce a desired image from among the recorded images, it is known to store event information related to motion detection or a sensor in association with an image or an event occurrence time. With such recording/reproduction systems, it is possible to display an image that was recorded at a certain event occurrence time based on event information selected by a user.

There are also recording/reproduction systems that can not only start recording when an event occurs, but can also record images before an event occurs. Such recording/reproduction systems are configured so as to be able to later display an image from before an event occurred as well, as necessary. Furthermore, with conventional recording/reproduction systems, it is possible to also record audio along with images and to reproduce recorded audio in synchronization when reproducing recorded images.

In recent years, event generation using image analysis technology has been performed due to advancements in image analysis technology and increases in the speed of central processing units for performing image analysis processing. The purposes and types of events have diversified, examples of which include removal detection for generating an event when an object has been carried away and abandonment detection for generating an event when an object has been left unattended.

Japanese Patent Laid-Open No. 2006-166322 discloses technology in which, in order to effectively reproduce a desired image from among recorded images, it is determined whether audio is to be reproduced in synchronization in accordance with the type of event, and in the case where audio is to be reproduced, it is determined at what volume the audio is to be reproduced.

Also, Japanese Patent Laid-Open No. 2005-260862 discloses technology in which thumbnail images are generated from recorded images and displayed, a displayed thumbnail image is selected, and the image corresponding to the selected thumbnail image is reproduced. Displaying thumbnail images in this way enables reproducing a target image with an understanding of changes over time in the images.

With all of the above-described conventional technology, image reproduction is performed in the direction in which time elapses from when an event occurred or an image corresponding to a thumbnail image.

However, depending on the type of event, there are cases where even if images at and after the time when an event occurred are viewed, an image truly desired by the user is not included among them. For example, in the case of the above-described abandonment detection, specifying the person who left an object unattended requires checking images while tracing back in time from when it was detected that the object was left unattended. In view of this, there is the problem that the user needs to think of an image reproduction method according to the type of event when performing operations.

An object of the present invention is to provide a recording/reproduction system for reproducing a desired image in a short time without burdening the user.

SUMMARY OF THE INVENTION

In order to resolve the above-described problem, the present invention provides a recording/reproduction system for reproducing a desired image in a short time without burdening the user.

According to one aspect of the present invention, there is provided a display control apparatus for causing a display unit to display an image that is recorded in a recording unit in association with an event detected by a detection unit, the display control apparatus comprising: a determination unit that determines, for each type of event, a display order indicating whether images recorded in the recording unit are to be displayed in chronological order or in reverse chronological order or a display speed at which the images recorded in the recording unit are to be reproduced by the display unit; and a display control unit that causes the display unit to display images recorded in association with an event in/at the display order or the display speed determined by the determination unit with respect to the event type of the event.

Further features of the present invention will become apparent from the following description of exemplary embodiments with reference to the attached drawings.

BRIEF DESCRIPTION OF THE DRAWINGS

FIG. 6 is a diagram showing an example of an event selection screen.

FIG. 7 is a diagram showing examples of display methods for event types.

FIG. 8 is a diagram showing an example of a display method editing screen.

FIG. 11 is a diagram showing an example of display sequences.

FIG. 12 is a diagram showing an example of a display sequence editing screen.

FIG. 13 shows a flowchart of processing performed by the display control apparatus according to the second embodiment.

DESCRIPTION OF THE EMBODIMENTS

Figure 1:
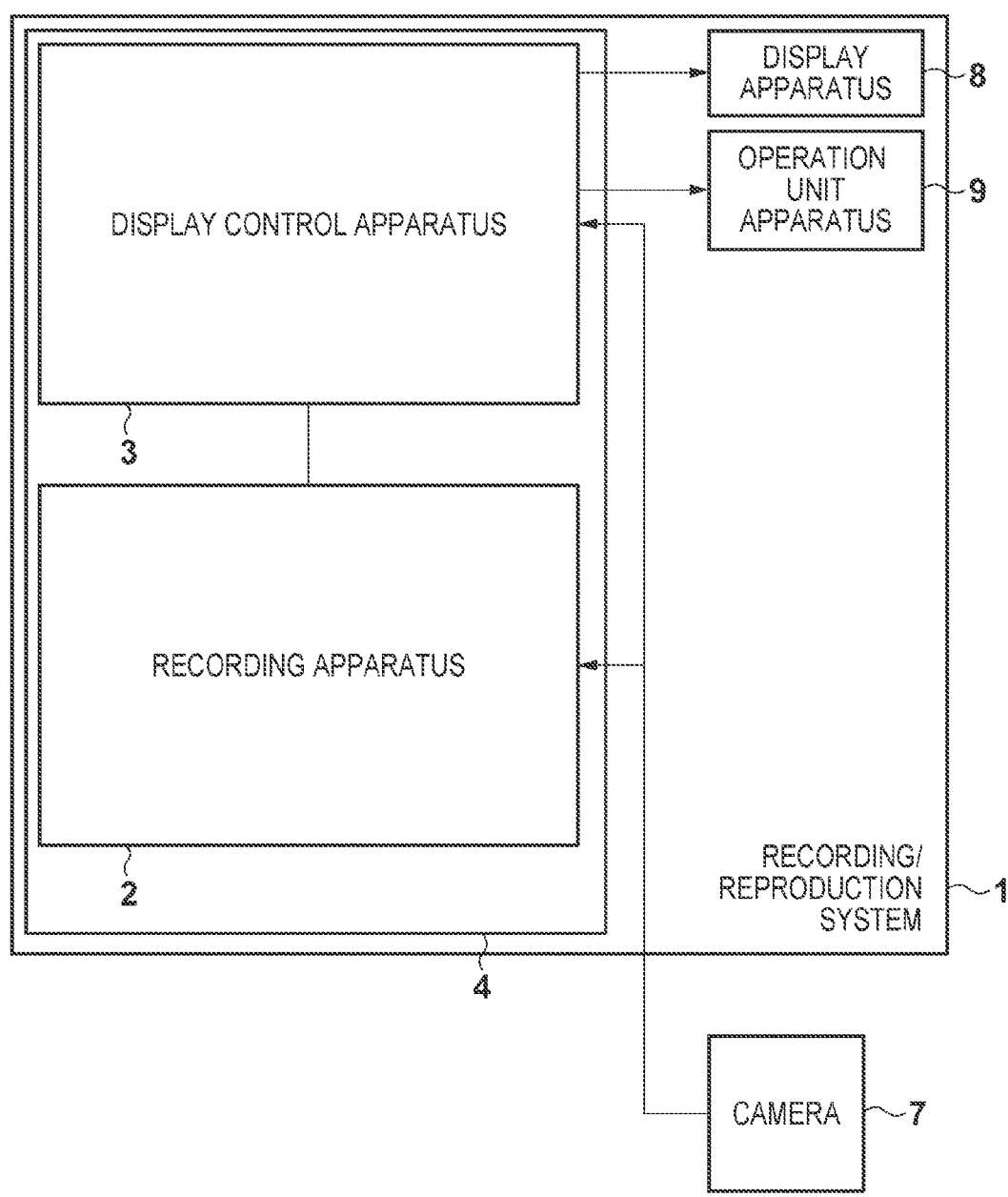
FIG. 1 is a diagram showing an example of a system configuration of a recording/reproduction system.

Hereinafter, a detailed description of embodiments for carrying out the invention will be given with reference to the drawings. The embodiments of the present invention will be described taking the example of a recording/reproduction system for recording captured images and reproducing recorded images. Also, the description will take the example of the case where images are recorded in association with the type of event that occurred and time that it occurred, and a user can select a display method or display sequence for each type of event when reproducing images.

First Embodiment

First, an example of the system configuration of a recording/reproduction system according to the present invention will be described with reference to FIG. 1. A recording/reproduction system 1 includes a recording apparatus 2 that receives and records images captured by a camera 7, a representative example of which is a network camera, and a display control apparatus 3 that performs control for receiving and reproducing images captured by the camera 7 and images recorded in the recording apparatus 2.

The recording/reproduction system 1 further includes a display apparatus 8 that displays a graphical user interface for allowing a user to perform operations on the display control apparatus 3 and images reproduced by the display control apparatus 3, and an operation input apparatus 9 that inputs operations for performing operations on the display control apparatus 3.

Note that as shown in FIG. 1, the configuration of the recording apparatus 2 and the configuration of the display control apparatus 3 may be realized by the one recording/reproduction apparatus 4, and the recording/reproduction apparatus 4 may be configured so as to include the functions of the recording apparatus and the functions of the display control apparatus.

Figure 2:
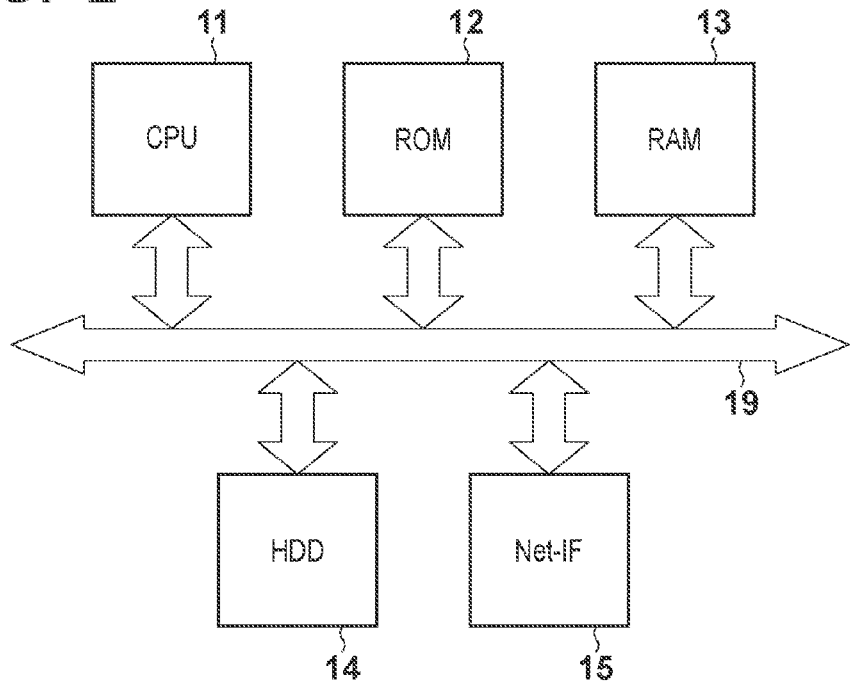
FIG. 2 is a diagram showing an example of a hardware configuration of a recording apparatus.
Figure 3:
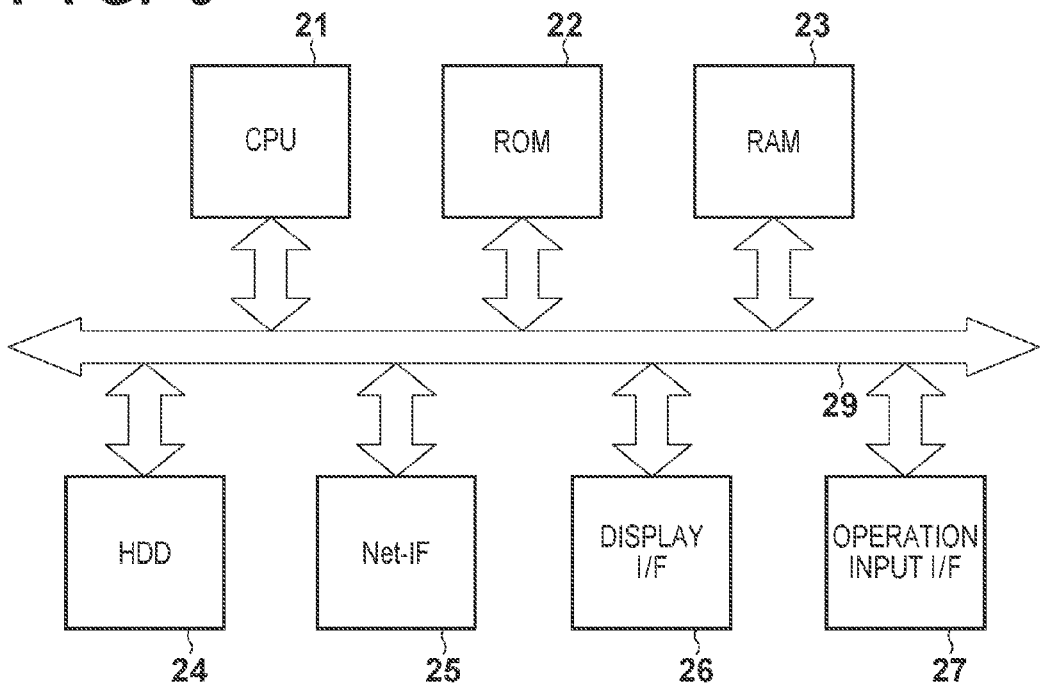
FIG. 3 is a diagram showing an example of a hardware configuration of a display control apparatus.

The following describes an example of the hardware configurations of the recording apparatus 2 and the display control apparatus 3 with reference to FIGS. 2 and 3. Included as hardware of the recording apparatus 2 shown in FIG. 2 are a CPU (central processing unit) 11, a ROM (read-only memory) 12, a RAM (random access memory) 13, and a storage medium 14, a representative example of which is an HDD (hard disk drive) or the like.

Here, the CPU 11 executes a recording control software program stored in the ROM 12 or the HDD 14 and controls various devices. Also, the ROM 12 and the HDD 14 hold various types of control software programs and information. The RAM 13 has a work area used when the CPU 11 executes processing, an area for saving information when error processing is performed, an area for loading control software programs, and the like.

The recording apparatus 2 also includes a network interface (Net-IF) 15 and can perform communication with the display control apparatus 3, the camera 7, and the like via a wire or wirelessly. Note that control software programs and information may be acquired from another information apparatus or the like via the Net-IF 15. Also, the above-described configurations are connected to each other by a CPU bus 19 that includes an address bus, an information bus, and a control bus.

The CPU 11 executes processing based on the above-described control software programs. Accordingly, processing related to part of the later-described functionality of the recording apparatus 2 is realized.

Next, included as hardware of the display control apparatus 3 shown in FIG. 3 are a CPU 21, a ROM 22, a RAM 23, an HDD 24, a Net-IF 25, and a CPU bus 29. These hardware elements are similar to those of the recording apparatus 2, but one difference is that the CPU 21 executes a reproduction control software program stored in the ROM 22 or the HDD 24.

The display control apparatus 3 further includes a display interface 26 for outputting a display signal to the display apparatus 8 and an operation input interface 27 that receives operation input from the operation input apparatus 9.

The CPU 21 executes processing based on the above-described control software program. Accordingly, processing related to part of the later-described functionality of the display control apparatus 3 or to a later-described flowchart is realized.

Figure 4:
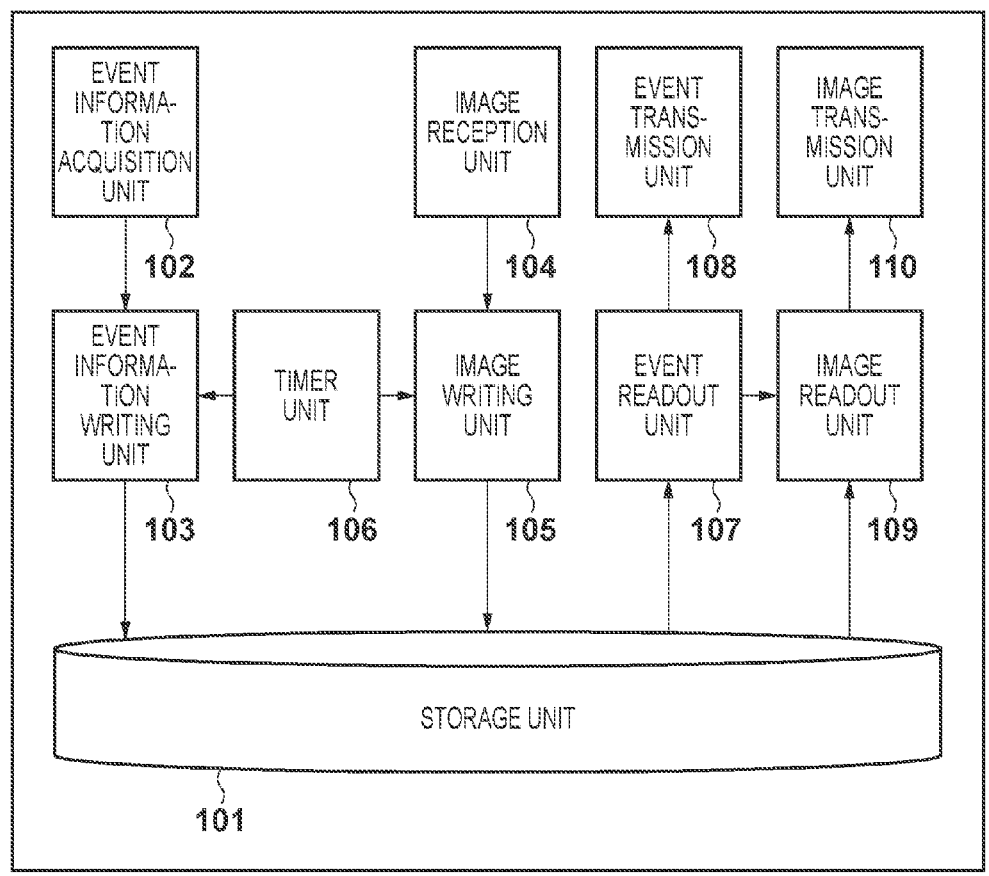
FIG. 4 is a diagram showing an example of a functional configuration of the recording apparatus.

The following describes an example of the functional configuration of the recording apparatus 2 with reference to FIG. 4. Included among the functions of the recording apparatus 2 shown in FIG. 4 are a function for writing later-described images and event information to a storage unit 101, a function for managing the time when such writing is performed, and a function for reading out images and event information from the storage unit 101.

Specifically, the following units realize the above-described functions. An event information acquisition unit 102 receives event information, and an event information writing unit 103 writes the event information received by the event information acquisition unit 102 to the storage unit 101. An image reception unit 104 receives images from the camera 7, and an image writing unit 105 writes images received by the image reception unit 104 to the storage unit 101. When images and event information are written, time information is acquired from a timer unit 106 that manages time information of the recording apparatus 2, and the time information is written in association with the images and event information.

Examples of the event information include a sensor event sent from the camera 7, and a motion detection event, an abandonment detection event, a removal detection event, a volume detection event, or the like obtained by image analysis or audio analysis performed by the camera 7. Note that besides event information from the camera 7, it is possible to receive event information from an image analysis apparatus or another external apparatus (not shown) using an image captured by the camera 7. Also, it is possible to provide the recording apparatus 2 with an image analysis unit (not shown) and receive event information generated by performing image analysis using images from the camera 7 that were obtained by the image reception unit 104.

Subsequently, an event information readout unit 107 reads out event information stored in the storage unit 101, and an event information transmission unit 108 transmits the event information read out by the event information readout unit 107 to the display control apparatus 3. An image readout unit 109 successively reads out images stored in the storage unit 101 upon receiving an image transmission request from the display control apparatus 3, and an image transmission unit 110 transmits images read out by the image readout unit 109 to the display control apparatus 3. Note that details of the image transmission request from the display control apparatus 3 and the processing executed by the recording apparatus 2 in accordance with the request will be described in the description of the functions of the display control apparatus 3.

Figure 5:
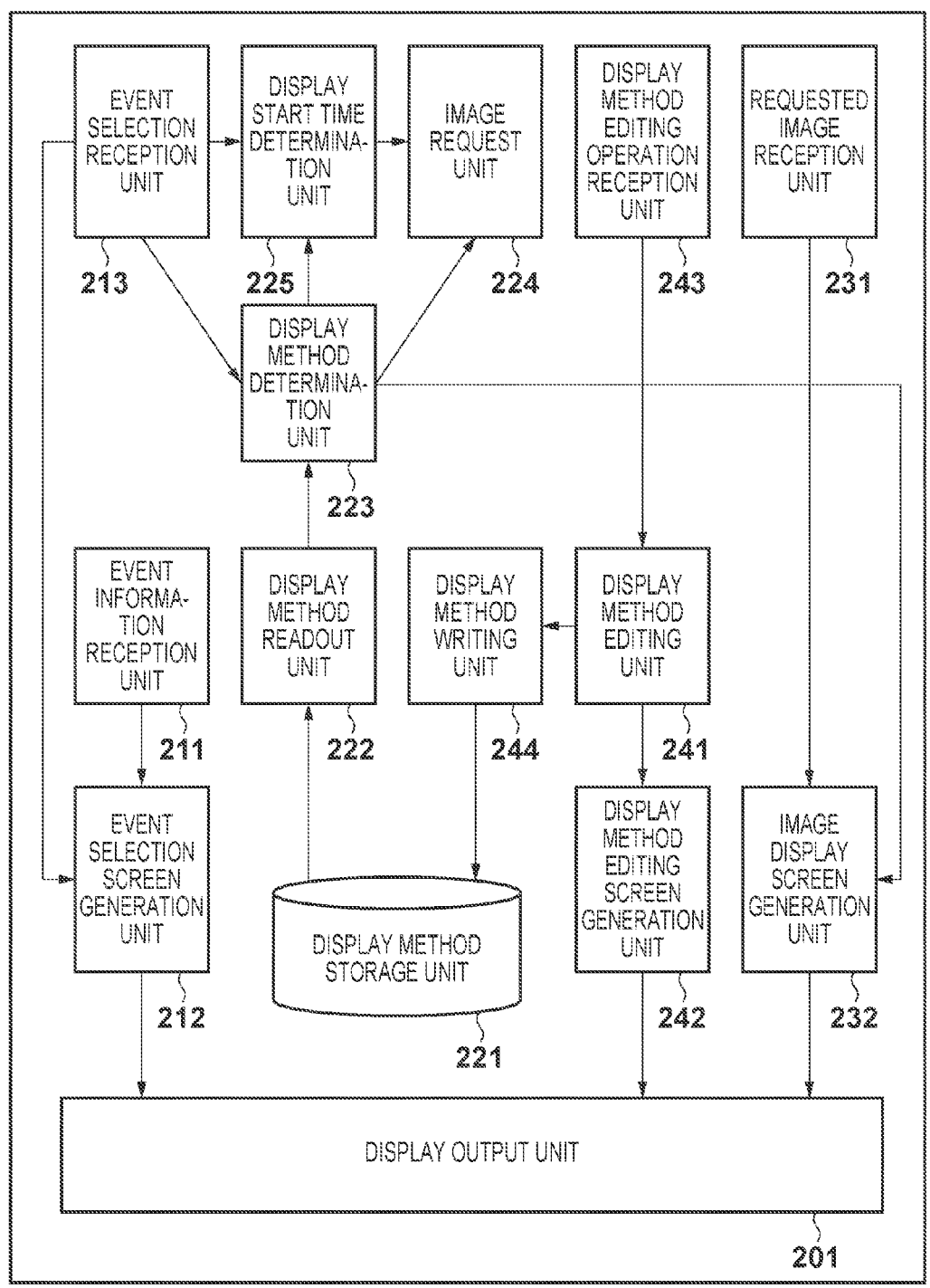
FIG. 5 is a diagram showing an example of a functional configuration of a display control apparatus according to a first embodiment.

The following describes an example of the functional configuration of the display control apparatus 3 with reference to FIG. 5. Included among the functions of the display control apparatus 3 shown in FIG. 5 are a function for generating an event selection screen, a function for generating a display method editing screen, and a function for reproducing images in accordance with a display method.

Specifically, the following units realize the above-described functions. A display output unit 201 outputs screens generated by later-described screen generation units to the display apparatus 8. An event information reception unit 211 receives event information transmitted from the recording apparatus 2, and an event selection screen generation unit 212 creates an event list from the event information received by the event information reception unit 211 and generates an event selection screen. An event selection reception unit 213 specifies event information selected by the user from the event selection screen generated by the event selection screen generation unit 212.

The following describes an example of the above-described event selection screen with reference to FIG. 6. As shown in FIG. 6, an event list is created from multiple events, and the event list is displayed in an event selection screen 300. An event information piece for each event indicates, for example, an event ID, an event occurrence camera ID, an event type, and an event occurrence time, but the present invention is not limited to this. Also, an event can be selected by, for example, a mouse operation such as double-clicking, but the selection method is not limited to this.

The description will now return to the functions of the display control apparatus 3 shown in FIG. 5. A display method readout unit 222 reads out display methods for each type of event stored in a display method storage unit 221. A display method determination unit 223 determines a display method based on the event type of the event selection received by the event selection reception unit 213. An image request unit 224 designates the display method determined by the display method determination unit 223 and the event information piece of the selected event or a display start time, and makes an image distribution request to the recording apparatus 2.

The following describes an example of display methods for event types according to the first embodiment with reference to FIG. 7. For the sake of convenience, FIG. 7 shows the case where the examples of display methods are displayed in a list. Note that although the example of a display order and a display speed is shown as the display methods for event types, it is possible to use only one of the two, or to specify, as additional information, display-related information such as the display size and brightness, for example.

The order in which images are to be displayed refers to a display order indicating whether, for example, images recorded in association with an event are to be displayed in chronological order or are to be displayed in reverse chronological order. Also, the speed at which images are to be displayed refers to a display speed indicating whether, for example, images recorded in association with an event are to be displayed in actual time or are to be displayed at a speed that is double actual time or a speed that is half actual time.

The description will now return to the functions of the display control apparatus 3 shown in FIG. 5. When the image request unit 224 requests display images from the recording apparatus 2, information that enables specifying at least a display method and a display start time is necessary. As a method for specifying the display start time, in the case where the event IDs shown in FIG. 6 are unique information included in the event information managed by the recording apparatus 2, designating the event ID enables the recording apparatus 2 to specify the event occurrence time. Also, the display start time may be designated based on the event occurrence time included in the event information.

Based on the display start time and above-described display method, the recording apparatus 2 can perform processing for, for example, reading out images in chronological order from the image that corresponds to the display start time, and distributing the images to the display control apparatus 3 in actual time. The recording apparatus 2 can also perform processing for reading out images in reverse chronological order from the image that corresponds to the display start time, and distributing the images at the speed of half actual time.

A display start time determination unit 225 determines a time by which the display start time is to be offset from the event occurrence time of the selected event. Depending on the event type and the display method determined by the display method determination unit 223, there are cases where it is advantageous to display images in chronological order from a time before the event occurrence time, and cases where it is advantageous to display images in reverse chronological order from a time after the event occurrence time. For example, in the case of a removal detection event that occurs when an object has been carried away, displaying images in reverse chronological order from the time when the object was carried away is advantageous for checking a series of images from before the removal to confirm that an object was carried away and in which direction the object was carried away. Note that even if the display start time determination unit 225 is not provided, a configuration is possible in which a display method and offset time are determined for each event type in advance, and similar images are received by also designating the offset time when the image request unit 224 makes an image request.

A requested image reception unit 231 receives the images that were requested from the recording apparatus 2. An image display screen generation unit 232 successively decodes and renders the images received by the requested image reception unit 231 and generates an image display screen. Here, the images received from the recording apparatus 2 are, for example, independent data pieces as in the case of JPEG images, and in the case where the image data is sent from the recording apparatus 2 in accordance with the display order, it is sufficient to successively display the images. However, in the case where previous/subsequent images are necessary when performing decoding processing, such as the case of MPEG-4 image data, it is not possible to perform successive display processing. In such a case, the image display screen generation unit 232 performs decoding processing in GOP units on the image data sent from the recording apparatus 2, and performs rendering processing in accordance with the display method determined by the display method determination unit 223.

A display method editing unit 241 performs processing for editing the display method for each event type. A display method editing screen generation unit 242 generates a display method editing screen for causing the display method editing unit 241 to perform display method editing. A display method editing operation reception unit 243 receives an editing operation when an operation was performed on the display method editing screen. A display method writing unit 244 saves the display method edited by the display method editing unit 241 to the display method storage unit 221.

The following describes an example of the display method editing screen according to the first embodiment with reference to FIG. 8. The display method for each event type can be edited in the display method editing screen. FIG. 8 shows an example in which in addition to the display order and display speed of the display methods shown in FIG. 7, it is possible to edit the offset from the event occurrence time for the display start time. Also, a screen 400 shown in FIG. 8 shows the example where editing was performed such that the display method ID is 1, the event type is sensor, the display start time offset is 10 seconds before the event occurrence time, the display order is chronological order, and the display speed is 1×.

Figure 9:
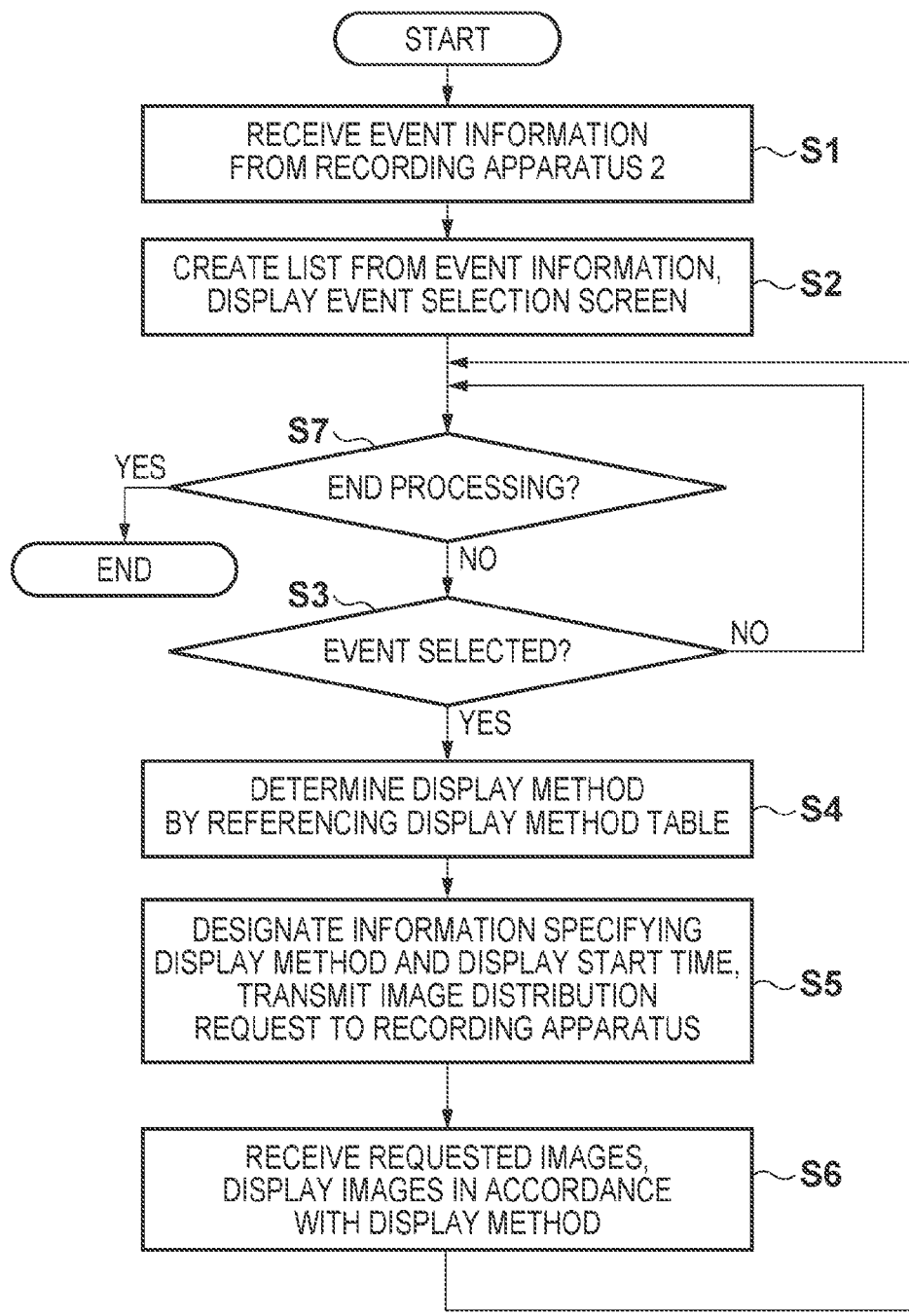
FIG. 9 shows a flowchart of processing performed by the display control apparatus according to the first embodiment.

The following describes an example of processing from startup of the display control apparatus 3 of the first embodiment to the end of processing, with reference to FIG. 9. First, the event information reception unit 211 of the display control apparatus 3 receives event information from the recording apparatus 2 (step S1), and then the event selection screen generation unit 212 creates a list from the received event information, and the event selection screen shown in FIG. 6 is displayed by the display apparatus 8 (step S2). Next, the event selection reception unit 213 monitors whether an end operation was performed by the user (step S7), and furthermore monitors whether an event was selected (step S3). Here, processing ends if an end operation was performed.

On the other hand, in the case where an event was selected, the display method readout unit 222 reads out display methods from the display method storage unit 221, and the display method determination unit 223 determines the display method that corresponds to the event type of the selected event (step S4). Then, information specifying the determined display method and a display start time that was determined by the display start time determination unit 225 is designated, and the image request unit 224 transmits an image distribution request to the recording apparatus 2 (step S5). Thereafter, the requested image reception unit 231 receives the requested images, the image display screen generation unit 232 generates images in accordance with the display method, and the generated images are displayed by the display apparatus 8 (step S6). At this time, it is desirable that the image reception and the display processing are performed in separate threads, and that the display control apparatus 3 returns from image reception to the operation monitoring state once display has started.

According to the above-described configuration, it is possible to display desired images in a short time in accordance with a selected event without the user needing to perform operations regarding the image reproduction method.

Second Embodiment

The following is a detailed description of a second embodiment of the present invention with reference to the drawings. Note that descriptions will be omitted for parts that are the same as in the above-described first embodiment. Also, a difference between the first embodiment and the second embodiment is that a display sequence is determined in accordance with the event type.

The configuration of a recording/reproduction system of the second embodiment as well as the hardware configurations of a recording apparatus and a display control apparatus and the functional configuration of the recording apparatus are similar to the first embodiment shown in FIGS. 1 to 4. The following describes an example of the functional configuration of the display control apparatus with reference to FIG. 10.

In the second embodiment, reproduction processing is performed in accordance with a predetermined display sequence. The configuration of the second embodiment differs from the configuration shown in FIG. 5 in that the second embodiment includes a display sequence storage unit 521, a display sequence readout unit 522, a display sequence determination unit 523, a display sequence editing unit 541, a display sequence editing screen generation unit 542, a display sequence editing operation reception unit 543, and a display sequence writing unit 544.

The display sequence storage unit 521 stores, as a display sequence, multiple images that are recorded in association with the same event and are to be subjected to successive display processing.

The display sequence readout unit 522 reads out display sequences stored for each type of event in the display sequence storage unit 521. The display sequence determination unit 523 determines a display sequence based on the event type of an event selection received by an event selection reception unit 513. An image request unit 524 designates the display method defined by the display sequence that was determined by the display sequence determination unit 523 and the event information of the selected event or a display start time, and makes an image distribution request to the recording apparatus 2.

The following describes an example of display sequences according to the second embodiment with reference to FIG. 11. For the sake of convenience, the examples of display sequences for event types that are stored in the display sequence storage unit 521 are displayed in a list in FIG. 11.

Each display sequence is configured from the display methods of multiple images that are to be displayed successively. In the example in FIG. 11, each display method indicates an order in which images are to be displayed, a speed at which images are to be displayed, and a display time for which images are to be displayed.

The order in which images are to be displayed refers to a display order indicating whether, for example, images recorded in association with an event are to be displayed in chronological order or in reverse chronological order. Also, the speed at which images are to be displayed refers to a display speed indicating whether, for example, images recorded in association with an event are to be displayed in actual time or are to be displayed at a speed that is double actual time or a speed that is half actual time. The display time for which images are to be displayed refers to the time for which, for example, images recorded in association with an event are to be displayed.

In the example in FIG. 11, an event type, a display start offset time, and an offset direction are indicated for each display sequence.

Figure 10:
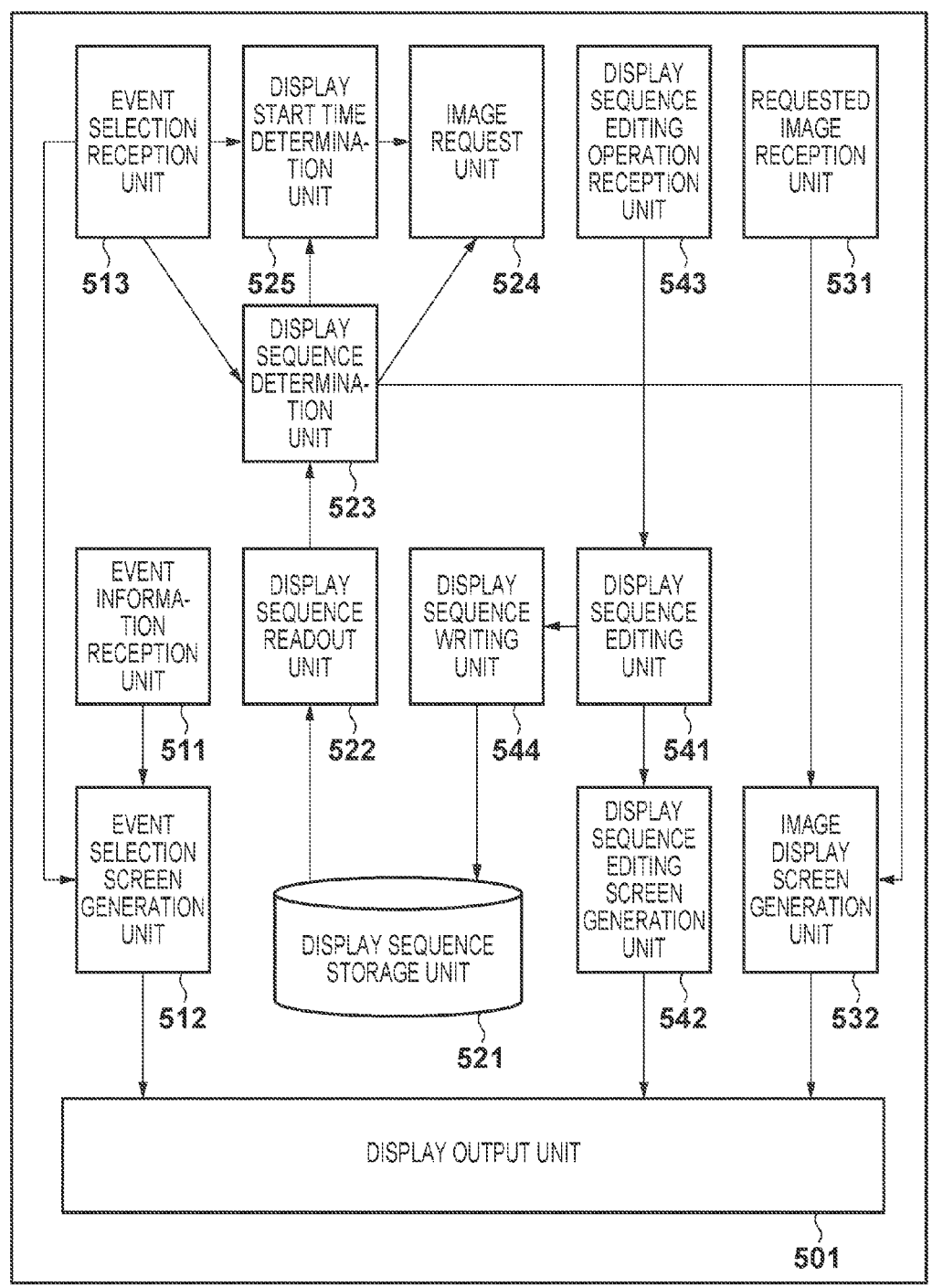
FIG. 10 is a diagram showing an example of a functional configuration of a display control apparatus according to a second embodiment.

The description will now return to the functions of the display control apparatus 3 shown in FIG. 10. When the image request unit 524 first requests display images from the recording apparatus 2, information that enables specifying at least a display method and a display start time is necessary. The information for specifying a display start time is the same as that in the first embodiment.

In the case where two or more display methods are defined by a display sequence, after the display time of the display method currently undergoing processing has reached the display time shown in FIG. 11, the image request unit 524 designates a new display method and makes an image transmission request to the recording apparatus 2. As a result of making this designation, the recording apparatus 2 distributes images using a method and speed in accordance with the new display method starting from the time of an image that has already been distributed. In other words, the recording apparatus 2 allows images to be displayed using a first display method for a predetermined time, and thereafter allows images to be displayed using a second display method that is different from the first display method.

A display start time determination unit 525 determines a display start time by offsetting a predetermined display start time from the event occurrence time of the selected event type.

A requested image reception unit 531 receives the images that were requested from the recording apparatus 2. An image display screen generation unit 532 successively decodes and renders the images received by the requested image reception unit 531 and generates an image display screen.

The display sequence editing unit 541 performs processing for editing the display sequence for each event type. The display sequence editing screen generation unit 542 generates a display sequence editing screen for causing the display sequence editing unit 541 to perform display sequence editing. The display sequence editing operation reception unit 543 receives the result of an editing operation performed on the display sequence editing screen. The display sequence writing unit 544 saves the display sequence subjected to editing processing by the display sequence editing unit 541 to the display sequence storage unit 521.

The following describes an example of the display sequence editing screen according to the second embodiment with reference to FIG. 12. The display sequence can be edited for each event type in the display sequence editing screen. In the example shown in FIG. 12, the offset direction and the offset time can be edited for a display sequence shown in FIG. 11. Also, in the example shown in FIG. 12, the display sequence editing screen is configured such that the order in which images are to be displayed, the speed at which images are to be displayed, and the time for which images are to be displayed can be edited for each display method.

The following describes an example of processing from startup of the display control apparatus 3 of the second embodiment to the end of processing, with reference to FIG. 13. First, the display control apparatus 3 receives event information from the recording apparatus 2 (step S21), and then creates a list from the received event information and displays the event selection screen (step S22). Next, the display control apparatus 3 monitors whether an end operation was performed by the user (step S27), and furthermore monitors whether an event was selected (step S23). Here, the display control apparatus 3 ends processing if an end operation was performed in step S23.

On the other hand, in the case where an event was selected, the display control apparatus 3 reads out display sequences from the display sequence storage unit 521 and determines the display sequence that corresponds to the event type (step S24). Then, by referencing the display sequence, the display control apparatus 3 designates information that specifies the display method for when display is started and the display start time, and transmits an image distribution request to the recording apparatus (step S25). Thereafter, the display control apparatus 3 receives the requested images and performs control for displaying the images in accordance with the designated display method (step S26). Furthermore, the display control apparatus 3 performs the image reception and the display processing in separate threads, and monitors whether a time period after which the display method is to be changed in accordance with the display sequence has elapsed (step S28). In step S28, it is desirable that in addition to the time elapse monitoring, image reception and display processing are performed in separate threads, and that the display control apparatus 3 returns from image reception to the state of monitoring other operations once display has started. Also, in the case where the display time of the display method currently being used has elapsed in step S28, the display control apparatus 3 designates the next display method and makes an image distribution request to the recording apparatus 2 (step S29), and then returns to the processing of step S26.

According to the above-described configuration, it is not only possible to display desired images in a short time in accordance with a selected event without the user needing to perform operations regarding the image reproduction method, but it is also possible to accurately display more relevant images.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-124462, filed Jun. 2, 2011, which is hereby incorporated by reference herein in its entirety.

What is claimed is:

1. A display control apparatus for causing a display unit to display an image that is recorded in a recording unit in association with an event detected by a detection unit, the display control apparatus comprising:
   a processor coupled to a memory and programmed to provide:
      a determination unit that determines, for each type of event type detected by a detection unit and associated with an image recorded in a recording unit, a display order, indicating whether images recorded in the recording unit are to be displayed in chronological order or in reverse chronological order, or a display speed at which the images recorded in the recording unit are to be reproduced by a display unit; and
      a display control unit that causes the display unit to display images recorded in association associated with an event in/at the in a display order or at a display speed determined by the determination unit with respect to the based on an event type of the event associated with the images to be displayed.

2. The display control apparatus according to claim 1, further comprising:
   a storage unit that wherein the memory stores, as a display sequence, a plurality of the images that are recorded in association associated with the event and that are to be successively displayed by the display unit, and
   wherein the determination unit determines a time by which a display start time of the display sequence is to be offset.

3. A recording/reproduction system comprising:
   an image capturing unit;
   a detection unit that detects an occurrence of an event;
   a recording unit that records an image captured by the image capturing unit in association with an event detected by the detection unit;
   a determination unit that determines, for each type of an event type of the event detected by the detection unit and associated with the image that is recorded in the recording unit, a display order, indicating whether images recorded in association associated with the event are to be displayed in chronological order or in reverse chronological order, or a display speed at which the images recorded in association associated with the event are to be reproduced by a display apparatus; and
   a display control unit that causes a display unit to display the images recorded in association associated with the event in/at in the display order or at the display speed determined by the determination unit with respect to based on the event type of the event.

4. The recording/reproduction system according to claim 3, further comprising:
 a storage unit that wherein the memory stores, as a display sequence, a plurality of images that are recorded in association associated with an event and that are to be successively displayed by the display unit, and
 wherein the determination unit determines a time by which a display start time of the display sequence is to be offset.

5. A non-transitory computer-readable recording medium having recorded thereon storing a program for causing that when executed causes a computer to perform a method comprising steps of, which is for causing a display unit to display an image that is recorded in a recording unit in association with an event detected by a detection unit, to execute the following:
 a determination step of determining, for each type of event type detected by a detection unit and associated with images recorded in a recording unit, a display order indicating whether the images are to be displayed in chronological order or in reverse chronological order; and
 a display control step of causing the controlling a display unit to display images recorded in association associated with an event in a display order determined in the determining step based on with respect to the an event type of the event.

6. The recording medium according to claim 5, further comprising wherein the program recorded thereon causes the computer to execute a storage step of:
 storing, as a display sequence, a plurality of the images that are recorded in association associated with the event and that are to be successively displayed by the display unit step, and causes the computer to execute,
 wherein, in the determination determining step, processing for determining a time by which a display start time of the display sequence is to be offset is executed.

7. A non-transitory computer-readable recording medium having recorded thereon storing a program for causing that when executed causes a computer to perform a method comprising steps of, which is for causing a display unit to display an image that is recorded in a recording unit in association with an event detected by a detection unit, to execute the following:
 a determination step of determining, for each type of event type detected by a detection unit and associated with images recorded in a recording unit, a display speed at which the images are to be reproduced by the display unit; and
 a display control step of causing the controlling a display unit to display images recorded in association associated with an event at a display speed determined in the determining step based on with respect to the an event type of the event.

8. The recording medium according to claim 7, further comprising wherein the program recorded thereon causes the computer to execute a storage step of:
 storing, as a display sequence, a plurality of images that are recorded in association associated with the same event and that are to be successively displayed by the display step unit, and causes the computer to execute,
 wherein, in the determination determining step, processing for determining a time by which a display start time of the display sequence is to be offset is executed.

9. The display control apparatus according to claim 1, further comprising:
 a receiving unit that receives event information of the event associated with the images recorded in the recording unit,
 wherein the determination unit determines, for each event type of the event information received by the receiving unit, the display order or the display speed.

10. The display control apparatus according to claim 1, wherein event types detectable by the detection unit include at least one of: a sensor event, a motion detection event, an abandonment detection event, a removal detection event, and a volume detection event.

11. The reproduction system according to claim 3, further comprising:
 a receiving unit that receives event information of the event associated with the images recorded in the recording unit,
 wherein the determination unit determines, for each event type of the event information received by the receiving unit, the display order or the display speed.

12. The reproduction system according to claim 3, wherein event types detectable by the detection unit include at least one of: a sensor event, a motion detection event, an abandonment detection event, a removal detection event, and a volume detection event.

13. The recording medium according to claim 5, further comprising a step of:
 receiving event information of the event associated with the images recorded in the recording step,
 wherein, in the determining step, determining, for each event type of the event information received in the receiving step, the display order.

14. The recording medium according to claim 5, wherein event types detectable by the detection unit include at least one of: a sensor event, a motion detection event, an abandonment detection event, a removal detection event, and a volume detection event.

15. The recording medium according to claim 7, further comprising a step of:
 receiving event information of the event associated with the images recorded in the recording step,
 wherein, in the determining step, determining, for each event type of the even information received in the receiving step, the display speed.

16. The recording medium according to claim 7, wherein event types detectable by the detection unit include at least one of: a sensor event, a motion detection event, an abandonment detection event, a removal detection event, and a volume detection event.

* * * * *